(12) United States Patent
Fujita et al.

(10) Patent No.: US 12,005,820 B2
(45) Date of Patent: Jun. 11, 2024

(54) SEAT SUSPENSION MECHANISM

(71) Applicant: DELTA KOGYO CO., LTD., Hiroshima (JP)

(72) Inventors: Etsunori Fujita, Hiroshima (JP); Ryuji Kuwano, Hiroshima (JP); Soichi Makita, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 132 days.

(21) Appl. No.: 17/770,371

(22) PCT Filed: Oct. 22, 2020

(86) PCT No.: PCT/JP2020/039738
§ 371 (c)(1),
(2) Date: Apr. 20, 2022

(87) PCT Pub. No.: WO2021/079942
PCT Pub. Date: Apr. 29, 2021

(65) Prior Publication Data
US 2022/0396187 A1 Dec. 15, 2022

(30) Foreign Application Priority Data
Oct. 22, 2019 (JP) .................................. 2019-192369

(51) Int. Cl.
*B60N 2/00* (2006.01)
*B60N 2/50* (2006.01)
(Continued)

(52) U.S. Cl.
CPC ............. *B60N 2/522* (2013.01); *B60N 2/507* (2013.01); *B60N 2/544* (2013.01)

(58) Field of Classification Search
None
See application file for complete search history.

(56) References Cited

U.S. PATENT DOCUMENTS

| | | | | |
|---|---|---|---|---|
| 5,169,112 A | * | 12/1992 | Boyles | B60N 2/508 248/421 |
| 5,580,027 A | * | 12/1996 | Brodersen | B60N 2/505 248/162.1 |

(Continued)

FOREIGN PATENT DOCUMENTS

| | | |
|---|---|---|
| CN | 102555867 A | 7/2012 |
| CN | 105774610 A | 7/2016 |

(Continued)

OTHER PUBLICATIONS

International Search Report (with English Translation) and Written Opinion (with Machine Translation) dated Jan. 19, 2021 in corresponding International Patent Application No. PCT/JP2020/039738; 13 pages.

*Primary Examiner* — Steven M Marsh
(74) *Attorney, Agent, or Firm* — Maier & Maier, PLLC

(57) ABSTRACT

A body weight adjustment mechanism for automatic adjustment to a balanced point is provided to improve vibration absorption characteristics and impact absorption characteristics. A torsion angle of a lower frame-side torsion bar when an upper frame is at a balanced point is found in advance, a torsion angle of the lower frame-side torsion bar in a state in which a person is seated is detected, the detected torsion angle is compared with the aforesaid balanced point torsion angle, a control signal is sent to an elastic force adjusting unit, and torsion angles of upper frame-side torsion bars are adjusted so that the torsion angle of the lower frame-side torsion bar becomes equal to the balanced point torsion angle. The upper frame can be set to an appropriate position in an initial state and a static state in which a person is seated and vibration and impact absorption characteristics are improved.

7 Claims, 13 Drawing Sheets

(51) Int. Cl.
 *B60N 2/52* (2006.01)
 *B60N 2/54* (2006.01)

(56) References Cited

U.S. PATENT DOCUMENTS

| | | | | |
|---|---|---|---|---|
| 8,567,770 | B2 * | 10/2013 | Fujita | B60N 2/50 |
| | | | | 248/575 |
| 2004/0159763 | A1 * | 8/2004 | Mullinix | B60N 2/508 |
| | | | | 248/421 |
| 2012/0007294 | A1 | 1/2012 | Fujita et al. | |
| 2020/0108751 | A1 * | 4/2020 | Dotzler | B60N 2/508 |
| 2020/0122612 | A1 * | 4/2020 | Fillep | B60N 2/505 |
| 2022/0371488 | A1 * | 11/2022 | Fujita | B60N 2/522 |

FOREIGN PATENT DOCUMENTS

| | | | | |
|---|---|---|---|---|
| CN | 210617932 U | 5/2020 | | |
| DE | 102019134244 A1 * | 6/2021 | ............... | B60N 2/10 |
| EP | 3835116 A1 * | 6/2021 | ............... | B60N 2/10 |
| JP | 2010179719 A | 8/2010 | | |
| JP | 2010179720 A | 8/2010 | | |
| JP | 201948489 A | 3/2019 | | |

\* cited by examiner

SEAT SUSPENSION MECHANISM

TECHNICAL FIELD

The present invention relates to a seat suspension mechanism used to support a vehicle seat.

BACKGROUND

Japanese Patent Application Laid-open No. 2018-95018 discloses a seat suspension mechanism in which an upper frame movable up and down relative to a lower frame is elastically supported by a magnetic spring and torsion bars. In this seat suspension mechanism, a characteristic that restoring force in the same direction as a working direction of restoring force of the torsion bars increases in accordance with an increase in a displacement amount is referred to as "a positive spring characteristic (a spring constant at this time is referred to as "a positive spring constant") and a characteristic that the restoring force in the same direction as the working direction of the restoring force of the torsion bars decreases in spite of the increase in the displacement amount is referred to as "a negative spring characteristic (a spring constant at this time is referred to as "a negative spring constant"). By making use of the fact that the magnetic spring exhibits the negative spring characteristic in a predetermined displacement range and combining the magnetic spring with the torsion bars exhibiting the positive spring characteristic, in the predetermined displacement range, the seat suspension mechanism has a characteristic of having a constant load region where a load value of the whole system resulting from the superposition of the characteristics of the magnetic spring and the torsion bars is substantially constant (a region where a spring constant is substantially zero) regardless of the displacement amount.

SUMMARY

In the seat suspension of Japanese Patent Application Laid-open No. 2018-95018, owing to the above-described structure using the magnetic spring and the torsion bars, vibrations having predetermined frequencies and amplitudes are absorbed using the constant load region where the spring constant resulting from the superposition of these is substantially zero, while energy caused by vibration or impact is absorbed by a damper suspended between the upper frame and the lower frame. The magnetic spring includes: stationary magnets fixed to the lower frame; and a movable magnet which is linked to the upper frame through links and moves relative to the stationary magnets in accordance with the up-down movement of the upper frame. The constant load region used to absorb the vibrations is set to correspond to the displacement range in which the magnetic spring exhibits the negative spring characteristic as described above, with a midpoint of this displacement range typically set to correspond to the vicinity of a neutral position of an up-down stroke of the upper frame.

Thus setting the upper frame in the vicinity of the neutral position of the up-down stroke in the state in which the person is seated makes it possible to reduce the nonuniformity of strokes in the upward direction and the downward direction and further widen a region where the constant load characteristic can be exhibited. Therefore, in the state in which a person is seated, a balanced point is desirably near the neutral position of the up-down stroke. However, when a person with a different weight seats himself/herself, the balanced point varies. Considering this, Japanese Patent Application Laid-open No. 2018-95018 has an initial position adjusting member that adjusts the torsion angle of the torsion bars connected to the upper frame and twisted by the movement of a link mechanism. This is a structure to adjust the balanced point when the person seats himself/herself to the neutral position of the up-down stroke by changing the torsion angle of the torsion bars according to a person's operation of an adjustment dial.

However, such manual adjustment using the adjustment dial is troublesome, and since calibrations are used as marks for adjusting the balanced point to the neutral position of the up-down stroke of the upper frame, there is still an accuracy problem. Further, the manual adjustment using the adjustment dial enables the adjustment in a state in which a person is seated during a static state but does not enable the adjustment following a change accompanying vibration or impact input during traveling.

The present invention was made in consideration of the above and has an object to provide a seat suspension mechanism that includes a body weight adjustment mechanism which automatically adjusts the position of an upper frame to a predetermined balanced point in a state in which a person is seated, and that is also capable of the automatic adjustment following a change accompanying vibration or impact input during traveling and thus is capable of more improving vibration absorption characteristics and impact absorption characteristics.

To solve the above-described problem, a seat suspension mechanism of the present invention is a seat suspension mechanism including: an upper frame and a lower frame which are supported so as to be capable of a separating and approaching operation relative to each other, with a link mechanism therebetween; and a spring mechanism which elastically biases the upper frame, wherein the spring mechanism includes:
  a first spring part which biases the upper frame in a direction in which the upper frame separates from the lower frame; and
  a second spring part which, when the upper frame is in a predetermined up-down movement range including a balanced point, exhibits a spring characteristic of biasing the upper frame in a direction in which the upper frame approaches the lower frame, to create a constant load spring characteristic by being combined with the first spring part, the seat suspension mechanism further including a body weight adjustment mechanism which adjusts a position of the upper frame to the balanced point in a state in which a person is supported, wherein the first spring part includes a lower frame-side torsion bar which is connected to the lower frame and is twisted by movement of the link mechanism and an upper frame-side torsion bar which is connected to the upper frame and is twisted by the movement of the link mechanism, wherein the body weight adjustment mechanism includes:
  an elastic force adjusting unit which is connected to the upper frame-side torsion bar and adjusts the position of the upper frame by twisting the upper frame-side torsion bar;
  a torsion angle detection sensor which detects a torsion angle of the lower frame-side torsion bar; and
  a control unit which compares the torsion angle of the lower frame-side torsion bar detected by the torsion angle detection sensor with a balanced point torsion angle that the lower frame-side torsion bar has when the upper frame is at the balanced point, and outputs, to the elastic force adjusting unit, a control signal instructing to twist the upper frame-side torsion bar by a predetermined amount to make the torsion angle of the lower frame-side torsion bar agree with the balanced point torsion angle.

Preferably, a damper whose damping force is smaller in the predetermined range including the balanced point than in a range other than the predetermined range is suspended between the lower frame and the upper frame, and owing to the elastic force adjusting unit constantly guiding the upper frame to the balanced point, input vibration is damped by phase-controlling.

Preferably, the second spring part includes a magnetic spring which includes a stationary magnet and a movable magnet whose position relative to the stationary magnet changes in accordance with the up-down movement of the upper frame relative to the lower frame, the magnetic spring exhibiting a nonlinear characteristic of changing in spring constant according to the position of the movable magnet relative to the stationary magnet.

Preferably, the second spring part further includes an auxiliary spring mechanism including between the lower frame and the upper frame: a pantograph link including an upper link and a lower link whose connection point is displaced in a front-rear direction; and a tensile coil spring suspended on the pantograph link in the front-rear direction, the auxiliary spring mechanism exhibiting a spring characteristic of biasing the upper frame downward when the upper frame is in the predetermined up-down movement range including the balanced point.

In the present invention, the torsion angle of the lower frame-side torsion bar when the upper frame is at the balanced point (balanced point torsion angle) is found in advance, the torsion angle of the lower frame-side torsion bar in the state in which the person is seated is detected, and the detected torsion angle is compared with the aforesaid balanced point torsion angle, the control signal is sent to the elastic force adjusting unit, and the upper frame-side torsion bar is twisted by a predetermined amount so that the torsion angle of the lower frame-side torsion bar becomes equal to the balanced point torsion angle. This enables the automatic setting of the position of the upper frame to an appropriate position in an initial state and a static state in which the person is seated.

Therefore, even if the upper frame moves up/down in accordance with vibration or impact input during traveling and accordingly the torsion angle of the lower frame-side torsion bar changes, it is possible to perform the control to cause the body weight adjustment mechanism to twist the upper frame-side torsion bar and constantly guide the upper frame to the balanced point, so that the motion of the upper frame through the link mechanism is easily phase-shifted from the input vibration. In particular, since the damper whose damping force is smaller in the predetermined range near the balanced point is provided between the upper frame and the lower frame, the phase shift is more easily caused, so that the vibration absorption characteristics and impact absorption characteristics efficiently work.

DETAILED DESCRIPTION OF THE EMBODIMENTS

Figure 1:
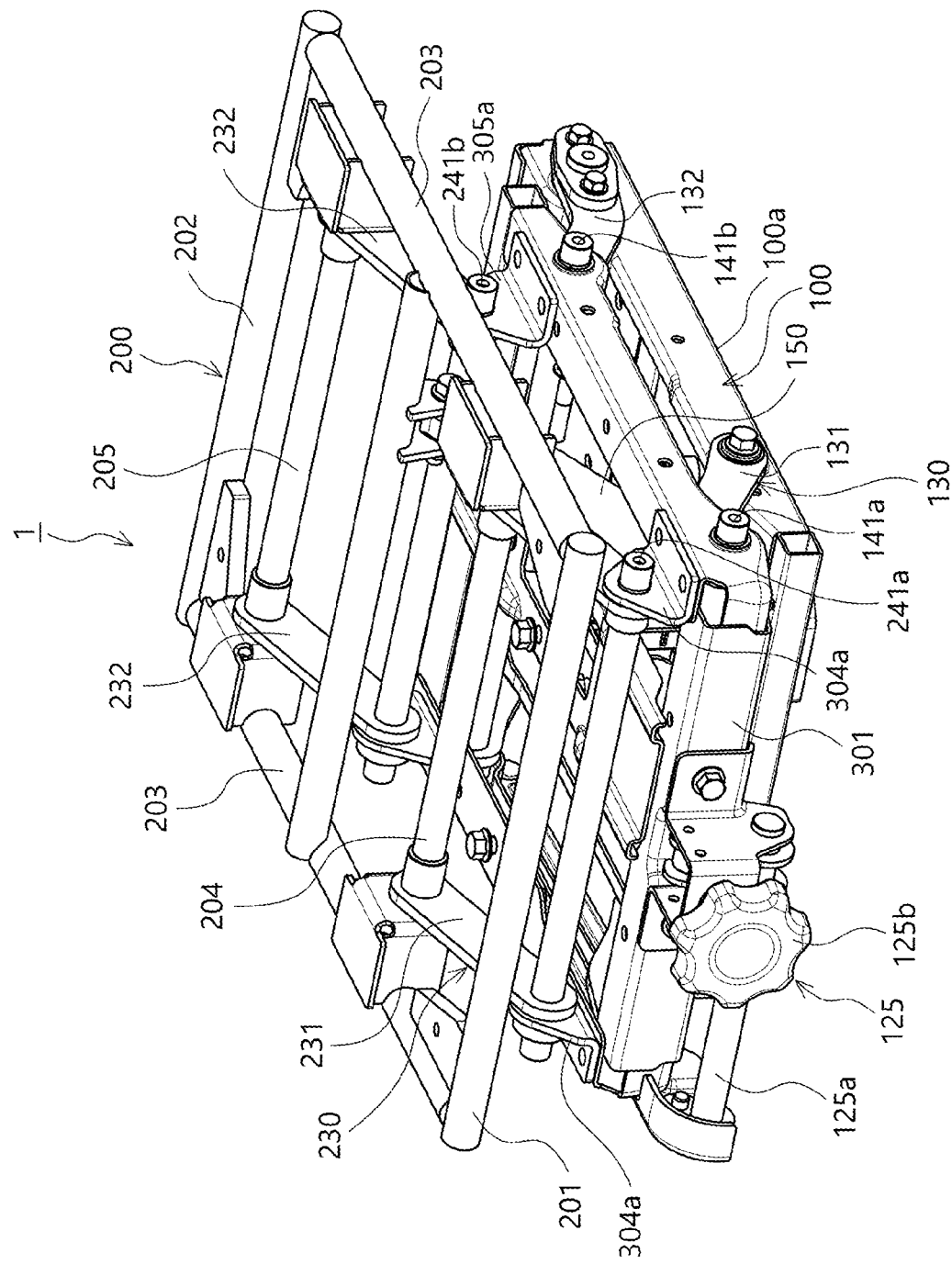
FIG. 1 is a perspective view of a seat suspension mechanism according to one embodiment of the present invention.
Figure 2:
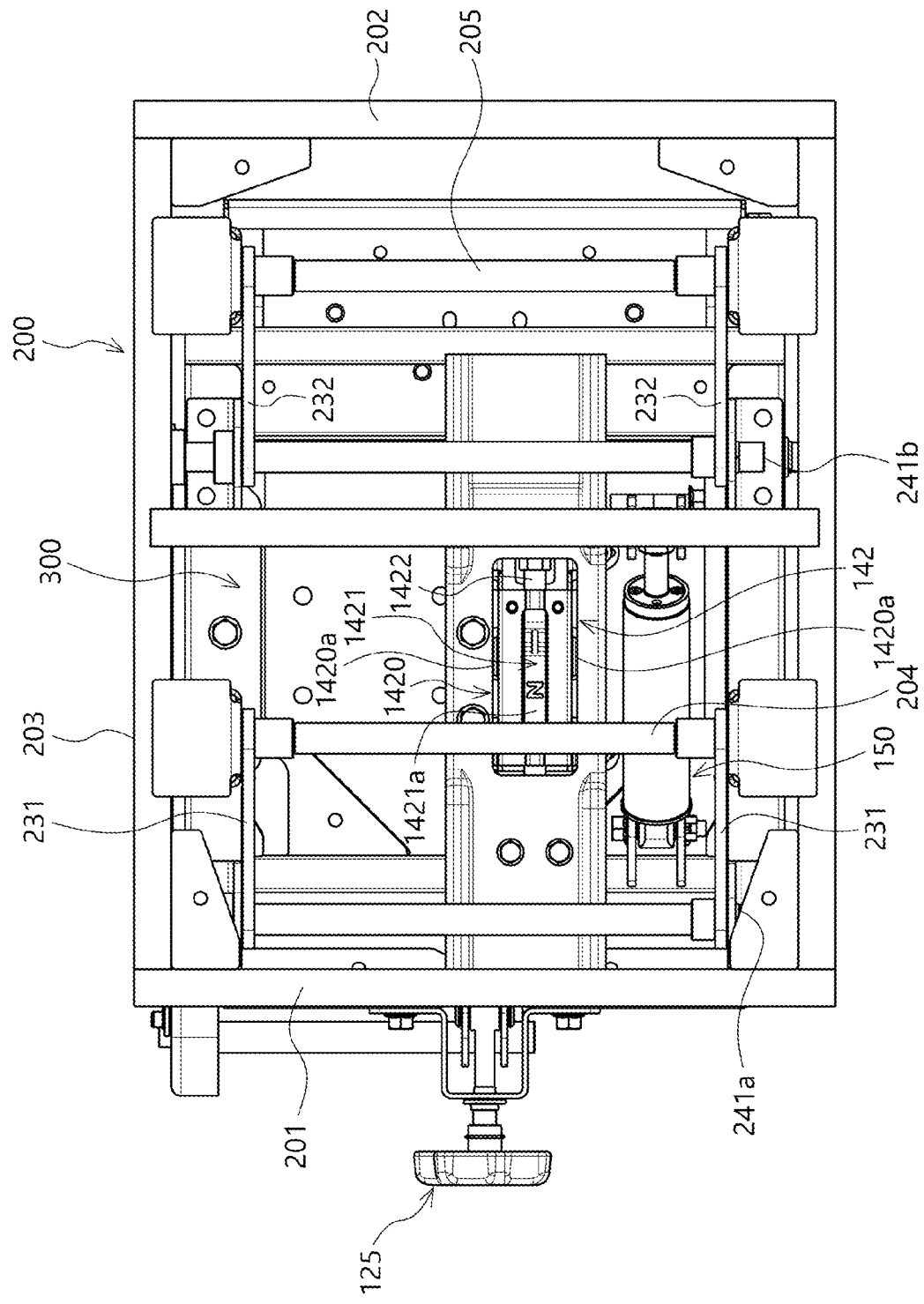
FIG. 2 is a front view of FIG. 1.

The present invention will be hereinafter described in more detail based on an embodiment illustrated in the drawings. FIG. 1 to FIG. 5 are views illustrating the structure of a seat suspension mechanism 1 according to this embodiment. The seat suspension mechanism 1 supports a seat for a vehicle such as a passenger car, a truck, a bus, or a forklift.

As illustrated in FIG. 1, the seat suspension mechanism 1 includes a lower frame 100 and an upper frame 200. The lower frame 100 is fixed to a vehicle floor which is a vehicle structure side and the upper frame 200 is attached to the seat. The lower frame 100 fixed to the vehicle floor is substantially square-shaped in plan view and supports the upper frame 200 through a link mechanism 130.

The link mechanism 130 includes a pair of left and right front links 131, 131 and a pair of left and right rear links 132, 132. The front links 131, 131 have lower portions 131a, 131a rotatably supported by side edge portions 100a, 100a of the lower frame 100 at positions close to the front and have upper portions 131b, 131b connected to side frames 203, 203 of the upper frame 200 at positions close to a front frame 201 of the upper frame 200 (see FIG. 3).

The rear links 132, 132 have lower portions 132a, 132a rotatably supported by the side edge portions 100a, 100a of the lower frame 100 at positions close to the rear and have upper portions 132b, 132b connected to the side frames 203, 203 of the upper frame 200 at positions close to a rear frame 202 of the upper frame 200. With this structure, the upper frame 200 is movable up and down relative to the lower frame 100, more accurately, moves up and down along rotation trajectories of the front links 131, 131 and the rear links 132, 132 because the link mechanism 130 is a parallel link structure including the front links 131, 131 and the rear links 132, 132. Specifically, the front links 131, 131 and the rear links 132, 132 are displaced along a direction in which they rotate around the lower portions 131a, 131a, 132a, 132a which are connection center points between the links 131, 132 and the lower frame 100, that is, along a direction in which the front links 131, 131 and the rear links 132, 132 lean forward to go toward a lower limit position (anticlockwise in FIG. 3) and along a direction in which they return in the opposite direction to go toward an upper limit position (clockwise direction in FIG. 3), and consequently, the upper frame 200 moves up and down.

Figure 3:
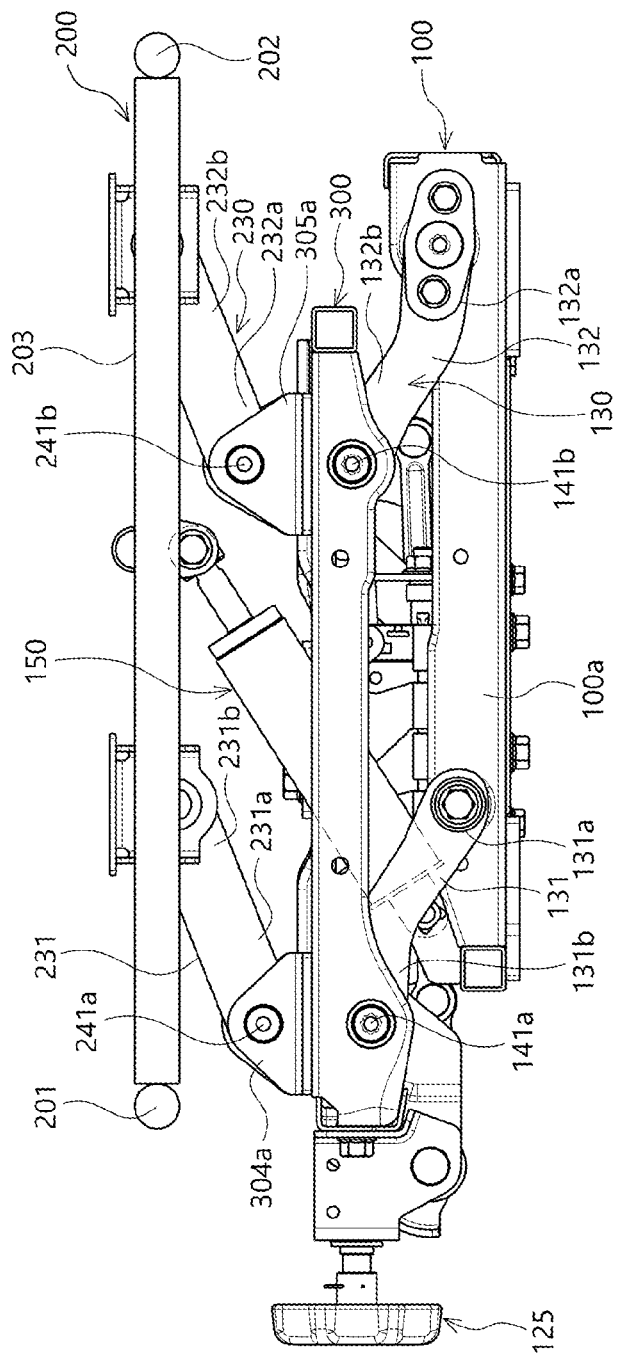
FIG. 3 is a side view of FIG. 1.

Between the connection center points at which the front links 131, 131 are connected to the side frames 203, 203 which are a predetermined interval apart from each other in the width direction of the upper frame 200, a first upper frame-side torsion bar 141a is disposed, and between the connection center points at which the rear links 132, 132 are connected to the side frames 203, 203, a second upper frame-side torsion bar 141b is disposed (see FIG. 3). The first and second upper frame-side torsion bars 141a, 141b have one-side ends connected to the upper portions 131b, 131b, 132b, 132b of the front links 131, 131 and the rear links 132, 132, and the other ends of the first and second upper frame-side torsion bars 141a, 141b do not rotate relative to the side frames 203, 203 of the upper frame 200.

Further, between the lower portions 132a, 132a of the rear links 132, 132, a lower frame-side torsion bar 141c is disposed. The lower frame-side torsion bar 141c has one end connected to the lower portions 132a, 132a of the rear links 132, 132, and the other end of the lower frame-side torsion bar 141c does not rotate relative to the side edge portion 100a of the lower frame 100.

In this embodiment, totally three torsion bars, namely, the first and second upper frame-side torsion bars 141a, 141b and the lower frame-side torsion bar 141c constitute a first spring part that exhibits a linear characteristic of changing substantially linearly in its load-deflection characteristic and biases the upper frame 200 in a direction in which the upper frame 200 separates from the lower frame 100. The first spring part is combined with a magnetic spring 142 and so on to be described later constituting a second spring part that exhibits, in a predetermined up-down movement range including a balanced point, a spring characteristic of biasing the upper frame 200 in a direction in which the upper frame 200 approaches the lower frame 100. The combination of the first spring part and the second spring part constitutes a spring mechanism 140 having a characteristic of having a constant load region in the predetermined displacement range.

Figure 4:
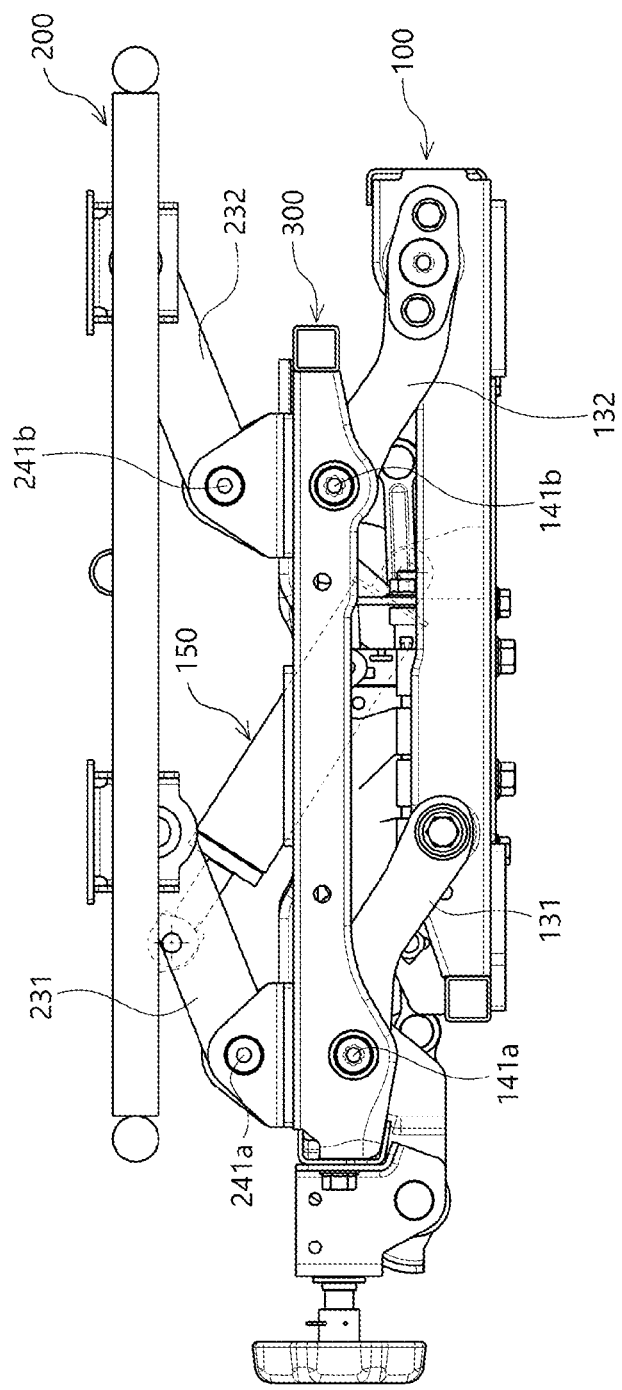
FIG. 4 is a plan view of FIG. 1.
Figure 5:
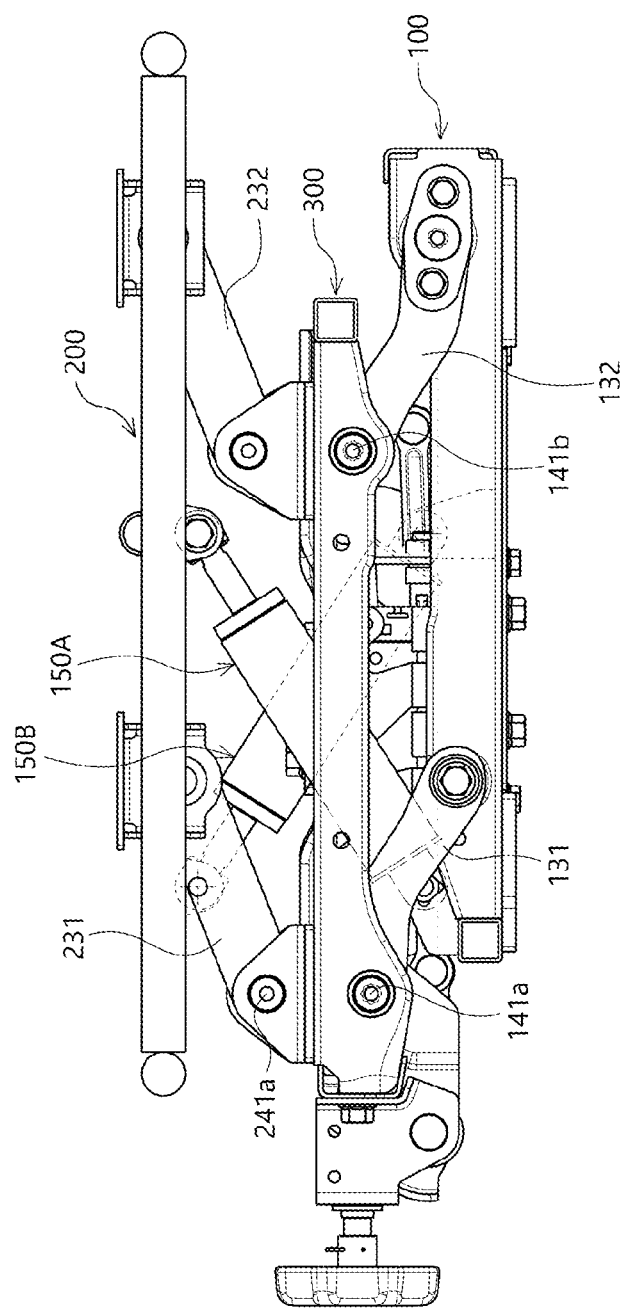
FIG. 5 is a sectional view for explaining the structures of dampers and a magnetic spring.
Figure 6:
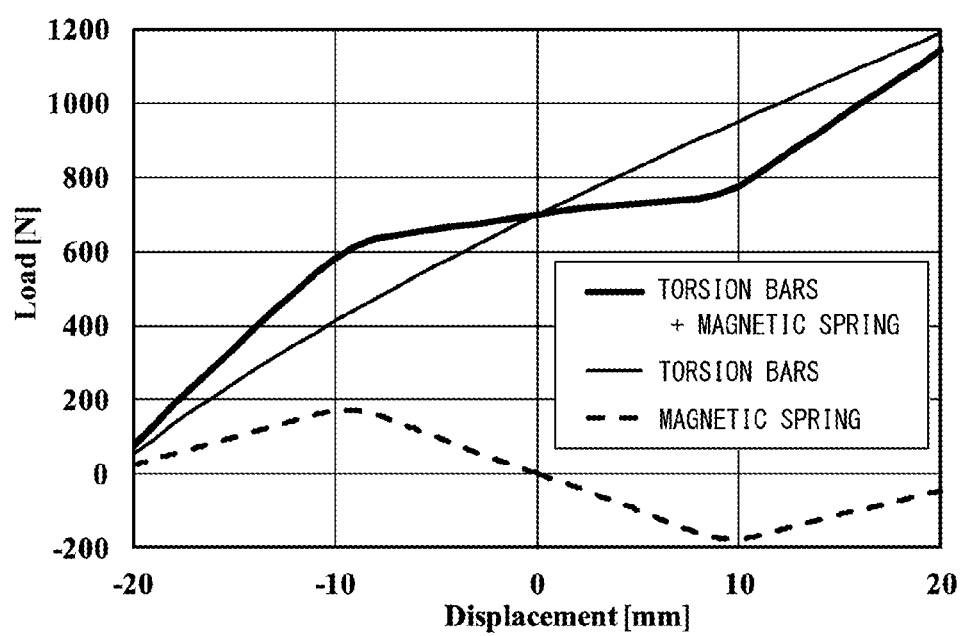
FIG. 6(a) is a side view for explaining the relation between the position of the seat suspension mechanism and an auxiliary spring mechanism.
FIG. 6(b) is a side view for explaining the relation between the position of the seat suspension mechanism and an auxiliary spring mechanism.
FIG. 6(c) is a side view for explaining the relation between the position of the seat suspension mechanism and an auxiliary spring mechanism.

The second spring part of this embodiment includes the magnetic spring 142. As illustrated in FIG. 4 and FIG. 5, the magnetic spring 142 includes a stationary magnet unit 1420 and a movable magnet unit 1421. The stationary magnet unit 1420 has a pair of stationary magnets 1420a, 1420a fixed to the lower frame 100 and facing each other at a predetermined interval in the width direction of the lower frame 100. As each of the facing stationary magnets 1420a, 1420a, bipolar magnets whose different poles are adjacent in the up-down direction are used, for instance, and the stationary magnets 1420a, 1420a are arranged with their same poles facing each other. The movable magnet unit 1421 has a movable magnet 1421a disposed in a space between the stationary magnets 1420a, 1420a facing each other at the predetermined interval. The movable magnet 1421a is magnetized in the up-down direction, for instance, and is supported by a support member 1422, and the support member 1422 is connected to a bracket 1424 fixed to the upper frame 200 to extend downward. Accordingly, when the upper frame 200 moves up/down relative to the lower frame 100, the movable magnet 1421a supported by the support member 1422 is displaced up/down in the space between the stationary magnets 1420a, 1420a.

Figure 7:
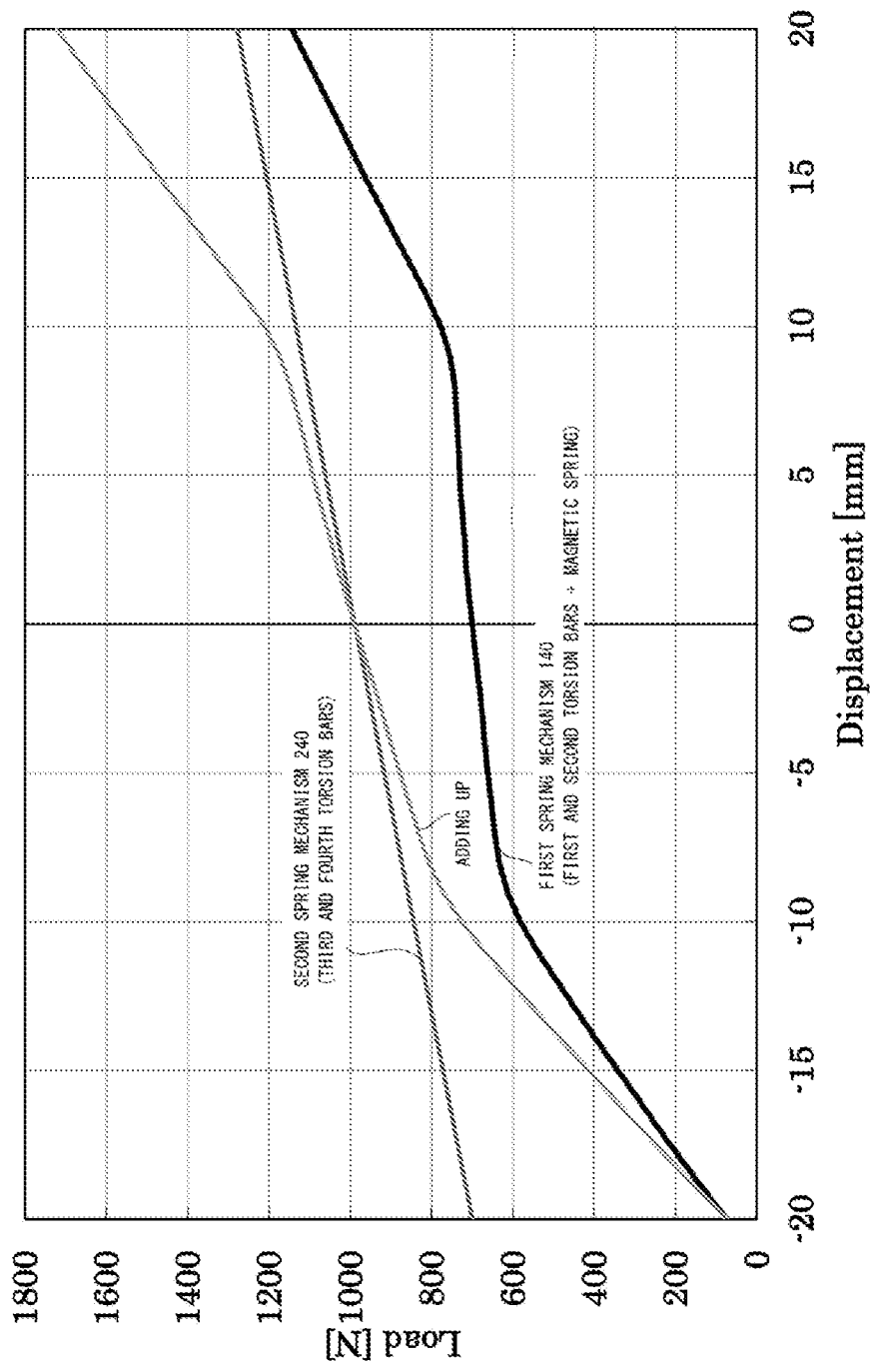
FIG. 7 is a chart illustrating examples of load-deflection characteristics of torsion bars and the magnetic spring and a load-deflection characteristic resulting from the superposition of these.

The spring characteristic that the magnetic spring 142 exhibits when the movable magnet 1421a moves in the space between the stationary magnets 1420a, 1420a changes depending on the position of the movable magnet 1421a relative to the stationary magnets 1420a, 1420a. For example, with a positive spring characteristic being defined as a characteristic that restoring force increases in a working direction of elastic force (restoring force) of the three torsion bars, namely, the first and second upper frame-side torsion bars 141a, 141b and the lower frame-side torsion bar 141c which are linear springs, that is, in a direction in which the upper frame 200 separates from the lower frame 100, the magnetic spring 142 exhibits, in its load-deflection characteristic, a negative spring characteristic (the broken-line characteristic in FIG. 7) that the restoring force in the aforesaid direction reduces in a predetermined displacement range, as illustrated in FIG. 7. That is, it exhibits the negative spring characteristic in the predetermined range (the range from about −9 mm to about +10 mm in the example in FIG. 7) corresponding to the vicinity of a position at which the movable magnet 1421a crosses the boundary between the N poles and the S poles of the two stationary magnets 1420a, 1420a in each of which different poles are adjacent to each other.

As a result, the spring mechanism 140 of this embodiment including the magnetic spring 142 and the above-described three torsion bars, namely, the first and second frame-side torsion bars 141a, 141b and the lower frame-side torsion bar 141c has a small spring constant in the range where the negative spring characteristic of the magnetic spring 142 functions (in the example in FIG. 7, the range from about −9 mm to about +10 mm).

Here, superposing the positive spring characteristic of the first and second upper frame-side torsion bars 141a, 141b and the lower frame-side torsion bar 141c and the negative spring characteristic of the magnetic spring 142 reduces the spring constant as described above, and preferably, the spring characteristic resulting from the superposition of these has a constant load region where a variation in a load value is a predetermined amount or less despite an increase in the displacement amount, that is, a region where the spring constant is substantially zero (preferably, the spring constant falls within a range of about −10 N/mm to about 10 N/mm). However, since the three torsion bars, namely, the first and second upper frame-side torsion bars 141a, 141b and the lower frame-side torsion bar 141c are used as the first spring part in this embodiment, even superposing the negative spring characteristic of the magnetic spring 142 may not enable the adjustment of the constant load region in the above-described manner, depending on the size, magnetic force, and so on of the magnetic spring 142. In such a case, auxiliary spring mechanisms 143 which constitute, together with the magnetic spring 142, the second spring part exhibiting the negative spring characteristic are preferably provided as in this embodiment.

As illustrated in FIG. 1, FIG. 3, FIG. 4, and FIG. 6, the auxiliary spring mechanisms 143 used in this embodiment each include a pantograph link 1430 and a tensile coil spring 1435. The pantograph link 1430 includes: two fixed-side links 1431, 1431 which have one-side ends 1431a, 1431a supported by the lower frame 100 and more separate from each other as they go toward their other ends 1431c, 1431c to form a substantially V-shape; and two movable-side links 1432, 1432 which have one-side ends 1432a, 1432a supported by the upper frame 200 and are disposed such that virtual lines connecting the one-side ends 1432a, 1432a and the other ends 1432c, 1432c form a substantially inverted V-shape when the upper frame 200 is at the uppermost end position (the position in FIG. 6(a)).

The tensile coil springs 1435 are each suspended between shaft members 1433, 1433 supporting both the other ends 1432c, 1432c of the movable-side links 1432, 1432 and the other ends 1431c, 1431c of the fixed-side links 1431, 1431.

Because of the above-described structure of the auxiliary spring mechanism 143, at the time of the up-down displacement, the orientation of the movable-side links 1432, 1432 of the pantograph link 1430 when the one-side ends 1432a, 1432a of the movable-side links 1432, 1432 are located higher than a straight line connecting the shaft members 1433, 1433 which are engagement support points of the tensile coil spring 1435 (the position in FIG. 6(a)) is opposite to that when they are located lower than the straight line (the position in FIG. 6(c)). Accordingly, when the upper frame 200 is at a position (the position in FIG. 6(a)) higher than a predetermined position, the tensile coil spring 1435 biases the one-side ends 1432a, 1432a of the movable-side links 1432, 1432 upward, and when the upper frame 200 is at a position (the position in FIG. 6(c)) lower than the predetermined position, the tensile coil spring 1435 biases the one-side ends 1432a, 1432a of the movable-side links 1432, 1432 downward. Therefore, setting the vicinity of the neutral position of the upper frame 200 as a position where the biasing direction by the tensile coil springs 1435 is reversed (the position in FIG. 6(b)) makes the auxiliary spring mechanisms 143 exhibit the negative spring characteristic of biasing the one-side ends 1432a, 1432a of the movable-side links 1432, 1432 downward in a predetermined displacement range, preferably, in the range where the above-described magnetic spring 142 exhibits the negative spring characteristic (between the positions in FIG. 6(b) and FIG. 6(c)).

Therefore, the second spring part of this embodiment has not only the negative spring characteristic of the magnetic spring 142 but also the characteristic resulting from the superposition of the negative spring characteristic by the auxiliary spring mechanisms 143 which are each the combination of the pantograph link 1430 and the tensile coil spring 1435. Therefore, in spite of the configuration to set the spring force in the positive direction high by disposing the three torsion bars 141a, 141b, 141c exhibiting the positive spring characteristic, this embodiment is capable of creating a constant load region and is capable of coping with a further increase in a load mass. Further, the biasing direction by the auxiliary spring mechanisms 134 switches while the upper frame 200 is within its up-down displacement range as described above. Accordingly, during a period up to an instant when the biasing direction switches, for example, during a period up to an instant when the upper frame 200 reaches the point where its position switches from an upward position to a downward position (during a period up to an instant when it reaches the position in FIG. 6(b) from the position in FIG. 6(a)), and contrarily, during a period up to an instant when it reaches the point where its position switches to an upward position from a downward position (during a period up to an instant when it reaches the position in FIG. 6(b) from the position in FIG. 6(c)), the auxiliary spring mechanisms 134 function as braking force to the movements in these directions, and thus are also capable of contributing to an improvement in the impact absorption characteristics.

Figure 8:
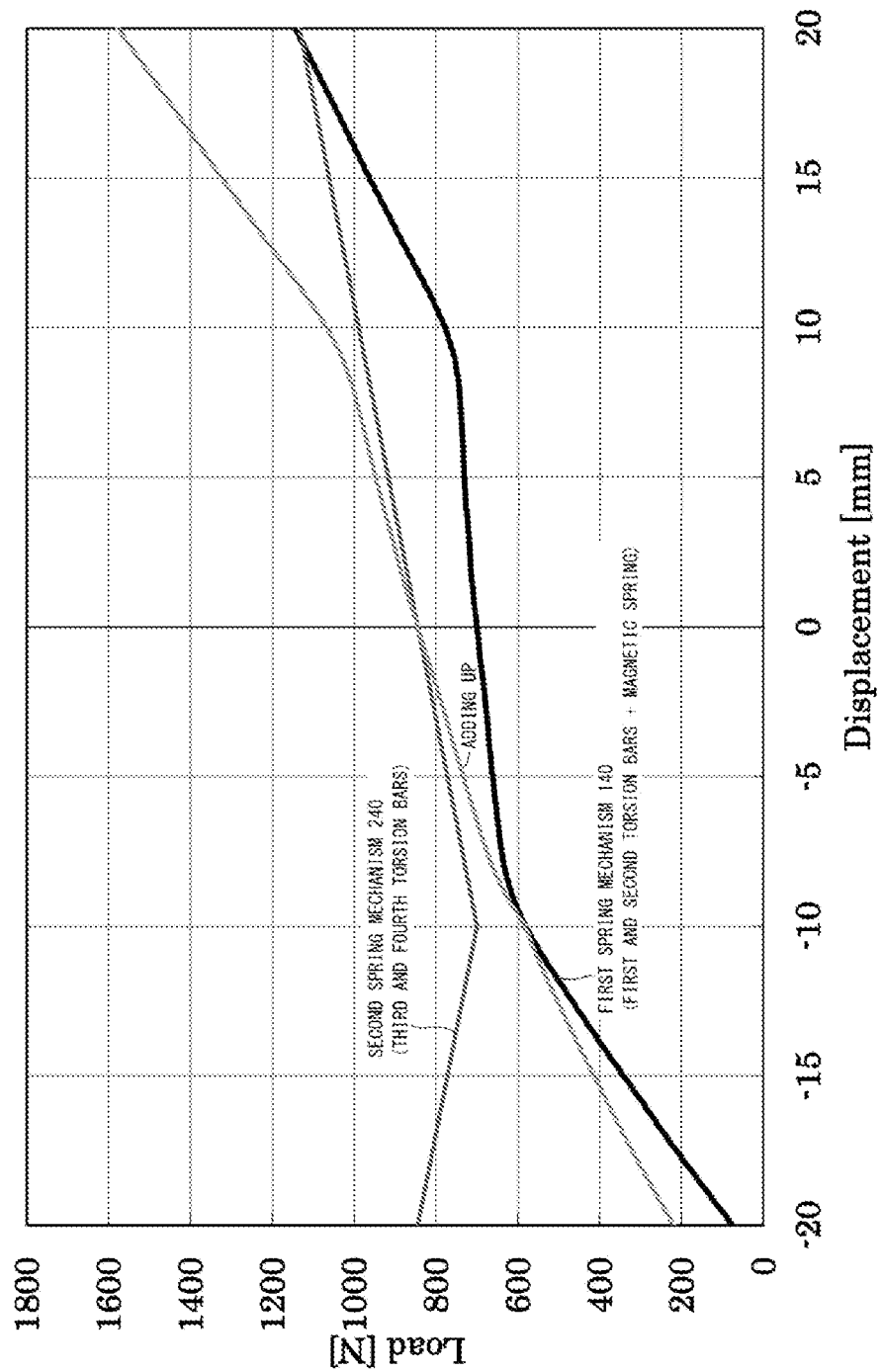
FIG. 8 is a side view of the dampers.
Figure 9:
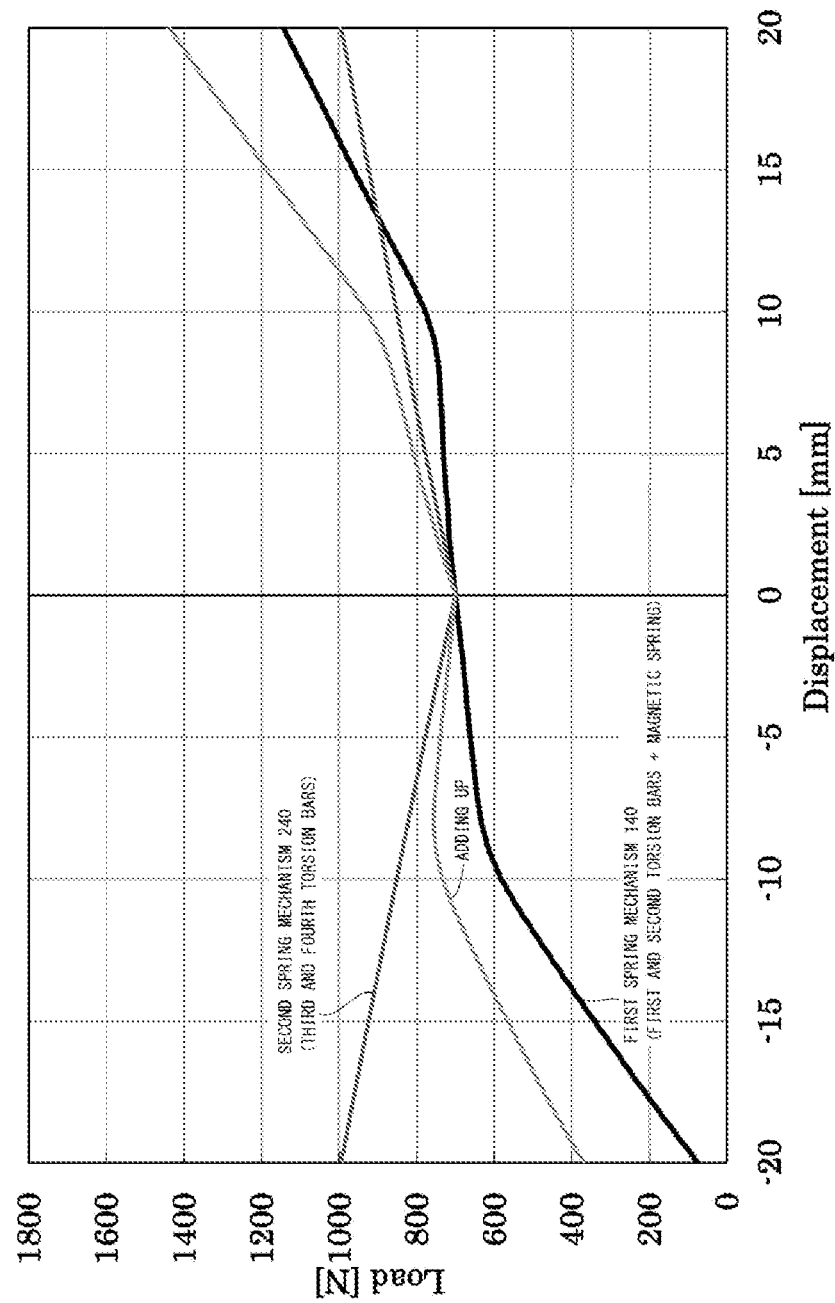
FIG. 9 is a sectional view taken along the B-B line in FIG. 8.

Here, as illustrated in FIG. 1, between the lower frame 100 and the upper frame 200, dampers 150, 160 exhibiting damping force of absorbing energy generated when the lower frame 100 and the upper frame 200 move up and down relative to each other are provided. As illustrated in FIG. 8 and FIG. 9, the dampers 150, 160 are telescopic dampers including cylinders 151, 161 and pistons 152, 162 which relatively move in the cylinders 151, 161. Preferably, the dampers 150, 160 are arranged in plurality in parallel and the attachment angles of the dampers 150, 160 are different as in this embodiment. With this structure, the damping force of the damper with a smaller attachment angle has a smaller vertical component, and the damping force acting on the upper frame 200 and the lower frame 100 works more gently than damping force in the case where the attachment angles of all the dampers are the same. However, a configuration having only one damper between the lower frame 100 and the upper frame 200 is of course acceptable.

The dampers 150, 160 may be typical oil dampers or the like but preferably, movement zones of the pistons 152, 162 in the cylinders 151, 161 which zones correspond to the predetermined up-down movement range including the balanced point when the upper frame 200 moves up and down relative to the lower frame 100 (the balanced point is a position that is set as close to the neutral position of the upper frame 200 as possible when a person seats himself/herself in a static state) are free running zones where substantially no damping force is generated (damping force in the free running zones is very low as compared with damping force in zones other than the free running zones).

As illustrated in FIG. 9, the dampers 150, 160 each having such a free running zone have a dual cylinder structure in which the cylinders 151, 161 include outer fixed cylinders 1511, 1611 and inner movable cylinders 1512, 1612 disposed on the inner sides thereof. The pistons 152, 162 are slidable in the inner movable cylinders 1512, 1612. The outer fixed cylinders 1511, 1611 have, at their longitudinal-direction ends, stopper portions 1511a, 1511b, 1611a, 1611b, and the inner movable cylinders 1512, 1612, which are shorter in the axial-direction length than the outer fixed cylinders 1511, 1611, are movable until longitudinal-direction ends 1512a, 1512b, 1612a, 1612b of the inner movable cylinders 1512, 1612 abut on the stopper portions 1511a, 1511b, 1611a, 1611b. Similarly, the pistons 152, 162 are movable until their longitudinal-direction ends 152a, 152b, 162a, 162b abut on the stopper portions 1511a, 1511b, 1611a, 1611b. The inner movable cylinders 1512, 1612 are longer in the axial-direction length than the pistons 152, 162, and piston rods 153, 163 are connected to the pistons 152, 162.

On outer peripheries of the pistons 152, 162, string portions 152c, 162c are provided which are formed of wound linear members such as strings and exhibit predetermined friction damping force between themselves and the inner movable cylinders 1512, 1612. In this embodiment, a viscous fluid such as a grease having a low consistency is made to adhere to the string portions 152c, 162c. The viscous fluid can be made to adhere to the linear members such as the strings forming the string portions 152c, 162c by impregnation or coating. Therefore, when the pistons 152, 162 move relative to the inner movable cylinders 1512, 1612, the friction damping force due to the tensions of the linear members forming the string portions 152c, 162c and speed-dependent viscous damping force by the viscous fluid act. Specifically, when the pistons 152, 162 are displaced relative to the inner movable cylinders 1512, 1612, the frictional force therebetween is converted to the tension of the string portions 152c, 162c, and with an increase in the displacement amount, the strings forming the string portions 152c, 162c are integrated to become hard and change so as to reduce in friction coefficient, so that heat generation is reduced. This change makes the viscous damping force speed-dependent. Accordingly, when the speed of an input is low, the action of the friction damping force is relatively large, but as the speed increases, the viscous damping force increases. Note that the frictional force and the viscous damping force to be generated are appropriately controlled by an increase/decrease of the number of turns of the strings forming the string portions 152c, 162c, gaps between adjacent parts of the wound strings, the number of layers of the wound strings, and so on.

In this embodiment, between the inner movable cylinders 1512, 1612 and the outer fixed cylinders 1511, 1611, low-friction members 1513, 1613 such as rolling members or sliding members (for example, felts) are interposed so that frictional force between the outer peripheral surfaces of the inner movable cylinders 1512, 1612 and the inner peripheral surfaces of the outer fixed cylinders 1511, 1611 becomes relatively smaller than the frictional force generated by the string portions 152c, 162c between the inner movable cylinders 1512, 1612 and the pistons 152, 162.

Consequently, when the pistons 152, 162 follow the movements of the piston rods 153, 163 to relatively move in the cylinders 151, 161, until the ends 1512a, 1612a, 1512b, 1612b of the inner movable cylinders 1512, 1612 abut on the stopper portions 1511a, 1611a, 1511b, 1611b, the inner movable cylinders 1512, 1612 and the pistons 152, 162 move together in the outer fixed cylinders 1511, 1611 owing to a difference of the frictional force between the inner movable cylinders 1512, 1612 and the pistons 152, 162 from the frictional force between the inner movable cylinders 1512, 1612 and the outer fixed cylinders 1511, 1611. At this time, frictional resistance between the inner movable cylinders 1512, 1612 and the outer fixed cylinders 1511, 1611 is very small owing to the low-friction members 1513, 1613, and the inner movable cylinders 1512, 1612 substantially freely run in the outer fixed cylinders 1511, 1611, so that almost no damping force is generated. After the ends 1512a, 1612a or 1512b, 1612b of the inner movable cylinders 1512, 1612 abut on the stopper portions 1511a, 1611a or 1511b, 1611b, the inner movable cylinders 1512, 1612 cannot move and only the pistons 152, 162 slide in the inner movable cylinders 1512, 1612 alone. Consequently, the aforesaid friction damping force and viscous damping force act between the pistons 152, 162 and the inner movable cylinders 1512, 1612.

Therefore, in the cylinders 151, 161, the ranges where the inner movable cylinders 1512, 1612 relatively move in the outer fixed cylinders 1511, 1611 are the free running zones where substantially no damping force is generated, and the distance of the free running zones corresponds to a difference in the axial-direction length between the outer fixed cylinders 1511, 1611 and the inner movable cylinders 1512, 1612. As a result, when the upper frame 200 is in the predetermined up-down movement range including the balanced point, the pistons 152, 162 do not move relative to the inner movable cylinders 1512, 1612, and the movement zones where no damping force is generated is formed. A preferable setting is such that, when the upper frame 200 is at the balanced point (the position adjusted closest possible to the neutral position of the whole stroke where the upper frame 200 is movable up and down) at the time of the up-down movement of the upper frame 200 relative to the lower frame 100 in the seated state, the inner movable cylinders 1512, 1612 are at substantially middle positions of the whole movement ranges in the outer fixed cylinders 1511, 1611. Consequently, the predetermined up-down movement range including the balanced point is formed uniformly above and below the balanced point.

When the upper frame 200 is vibrated relative to the lower frame 100 by vibration input during traveling, in the case corresponding to the aforesaid free running zones, the dampers 150, 160 exert substantially no damping force, and mainly the spring mechanism 140 takes on the vibration absorption function, and the vibration is damped by phase-shifting from the input vibration.

In the case where vibration on a predetermined level or more with a low frequency and a large amplitude is input, the pistons 152, 162 move to positions outside the free running zones, so that the dampers 150, 160 exert the damping force to absorb impact energy. Further, the auxiliary spring mechanisms 143 of this embodiment also help absorb the impact energy as described above.

Having the above-described link mechanism 130, spring mechanism 140, and dampers 150, 160, the seat suspension mechanism 1 of this embodiment exhibits excellent impact absorption characteristics and vibration absorption characteristics, and these characteristics are most excellent when the upper frame 200 is at the balanced point (the position adjusted closest possible to the neutral position of the whole stroke where the upper frame 200 is movable up and down) at the time of the up-down movement of the upper frame 200 relative to the lower frame 100 in the seated state as described above.

Figure 10:
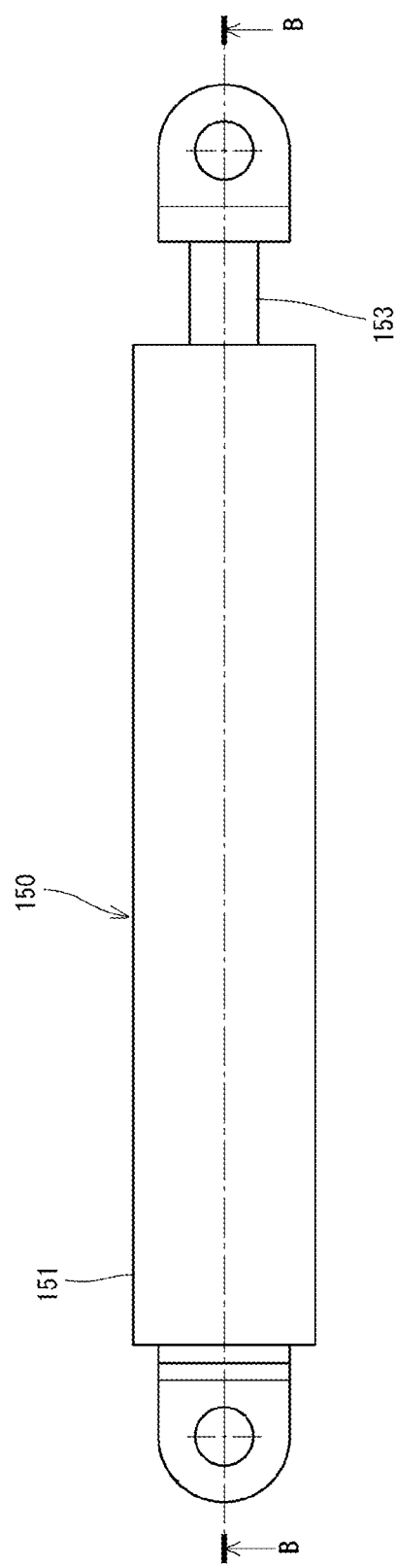
FIG. 10 is a diagram schematically illustrating the structure of a body weight adjustment mechanism.

Therefore, the seat suspension mechanism 1 of this embodiment has a body weight adjustment mechanism 300 which adjusts the position of the upper frame 200 to the balanced point while a person is supported. As illustrated in FIG. 4 and FIG. 10, the body weight adjustment mechanism 300 includes an elastic force adjusting unit 310, a torsion angle detection sensor 320, and a control unit 330.

As illustrated in FIG. 1 and FIG. 4, the elastic force adjusting unit 310 has a motor 311 and an adjusting member 312 which is put into operation by the motor 311. The adjusting member 312 has a rotary shaft 312a rotated by the motor 311 and a rotational force transmission frame 312b moved forward and rearward by the rotation of the rotary shaft 312a and provided substantially in parallel to one of the side frames 203 of the upper frame 200. At a front end portion of the rotational force transmission frame 312b, a first engagement plate 312c engaged with the first upper frame-side torsion bar 141a is provided, and at its rear end portion, a second engagement plate 312d engaged with the second upper frame-side torsion bar 141b is provided.

The rotational force of the motor 311 is transmitted to the rotational force transmission frame 312b through the rotary shaft 312a of the adjusting member 312. This displaces the rotational force transmission frame 312b forward or rearward to cause the forward or rearward rotation of the first engagement plate 312c and the second engagement plate 312d attached to the rotational force transmission frame 312b. The rotation of the first engagement plate 312c twists the first upper frame-side torsion bar 141a in either direction, and the rotation of the second engagement plate 312d twists the second upper frame-side torsion bar 141b in either direction. Consequently, the elastic force of the first and second upper frame-side torsion bars 141a, 141b is adjusted. The damping force of the dampers 150, 160, which does not practically act near the balanced point as described above, does not become large resistance force in controlling the motor 311, and therefore, a small-sized and small-power motor suffices for the motor 311.

The torsion angle detection sensor 320 detects a torsion angle of the lower frame-side torsion bar 141c. An attachment frame 321 is provided on a rear frame 102 of the lower frame 100, and the torsion angle detection sensor 230 is disposed on the attachment frame 321. The torsion angle detection sensor 320 is constituted by, for example, a magnetic circuit sensor and detects the torsion angle from a magnetic field change caused by the twisting of the lower frame-side torsion bar 141c.

The control unit 330 is attached to, for example, the attachment frame 321 of the seat suspension mechanism 1 (see FIG. 4) and includes a CPU and a circuit board on which a storage element and so on are mounted. The control unit 330 stores a characteristic of a detection signal of the torsion angle detection sensor 320 corresponding to the torsion angle that the lower frame-side torsion bar 141c has when the upper frame 200 is at the balanced point (balanced point torsion angle $\theta 1$) (or stores a torsion angle corresponding to the characteristic) in advance. When the seat suspension mechanism 1 is vibrated by a person seated or vibration input, the upper frame 200 supporting the weight moves up/down, and accordingly, the link mechanism 130 moves up/down in a manner of depicting an arc around the lower portions 131a, 132a of the links 131, 132. The torsion angle detection sensor 320 transmits a detection signal corresponding to this change to the control unit 330. The control unit 330 receives the detection signal of the torsion angle detection sensor 320 to find a torsion angle at the current moment (current torsion angle $\theta 2$) corresponding to the characteristic of the detection signal.

After finding the current torsion angle $\theta 2$, the control unit 330 compares it with the balanced point torsion angle $\theta 1$ to find a difference therebetween, and according to the difference, performs the control to drive the motor 311 to twist the first and second upper frame-side torsion bars 141a, 141b by a predetermined angle through the adjusting member 312. As a result, the rotation angle of the front links 131 and the rear links 132 of the link mechanism 130 changes, and the current torsion angle $\theta 2$ of the lower frame-side torsion bar 141c becomes equal to the balanced point torsion angle $\theta 1$.

Figure 11:
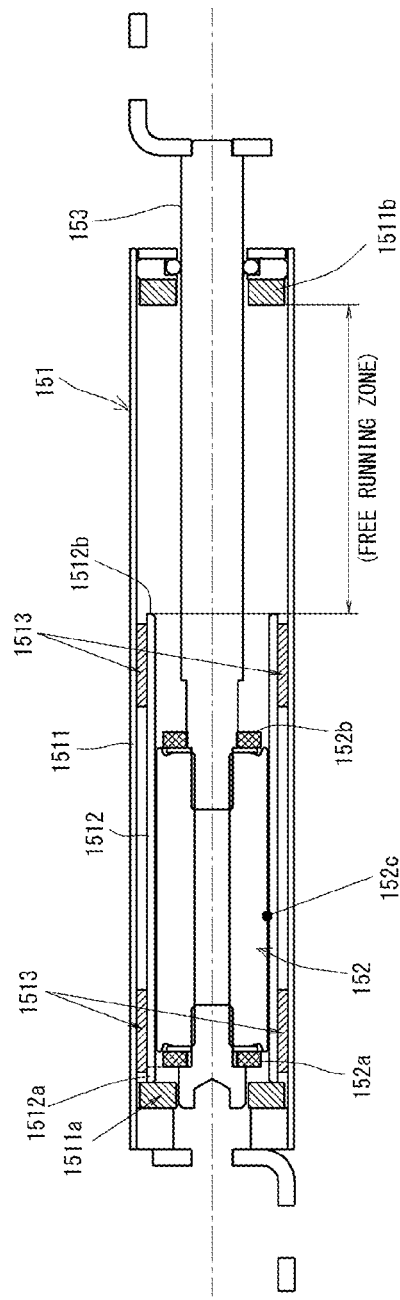
FIG. 11 is an explanatory flowchart of the operation of the body weight adjustment mechanism.
Figure 12:
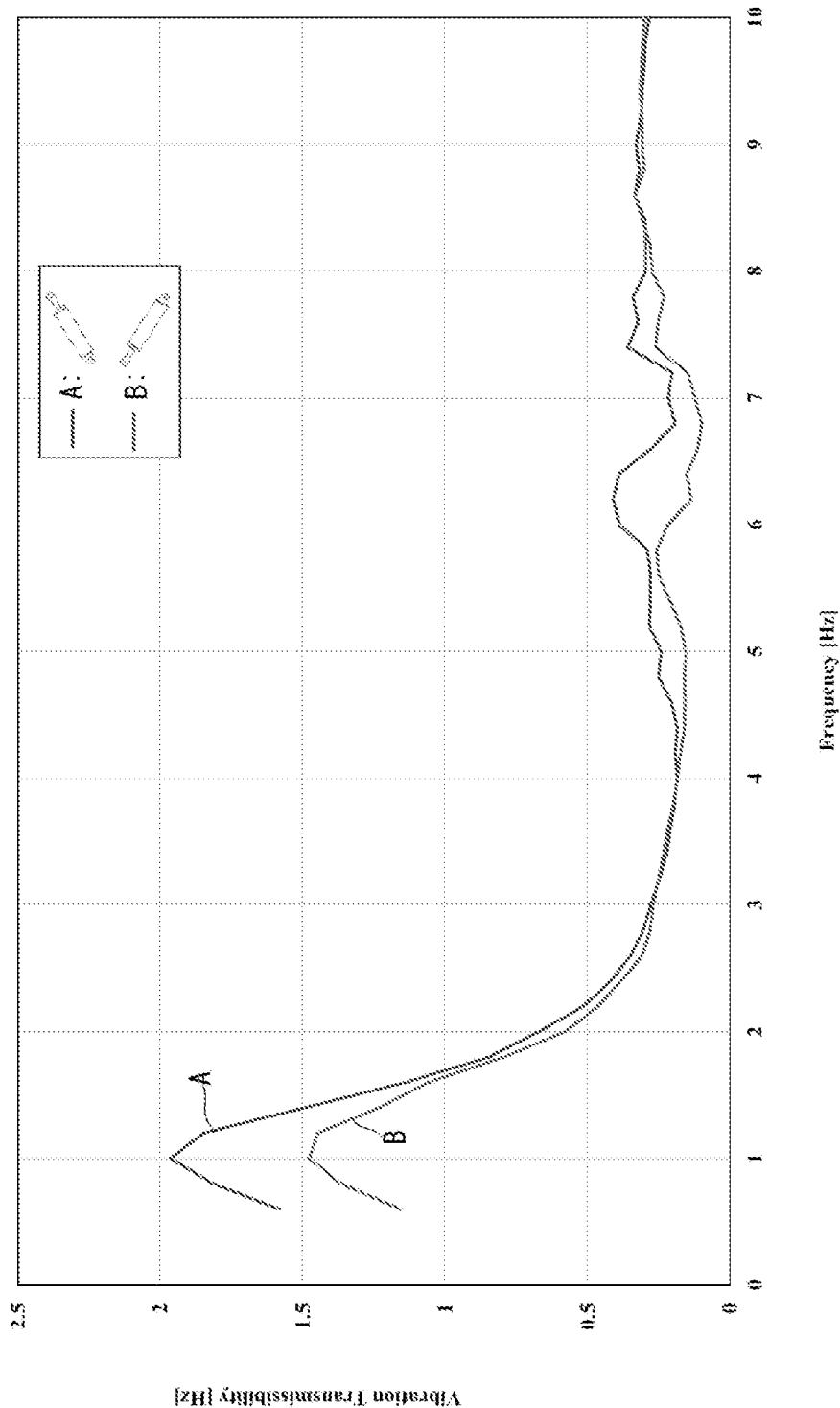
Figure 13:
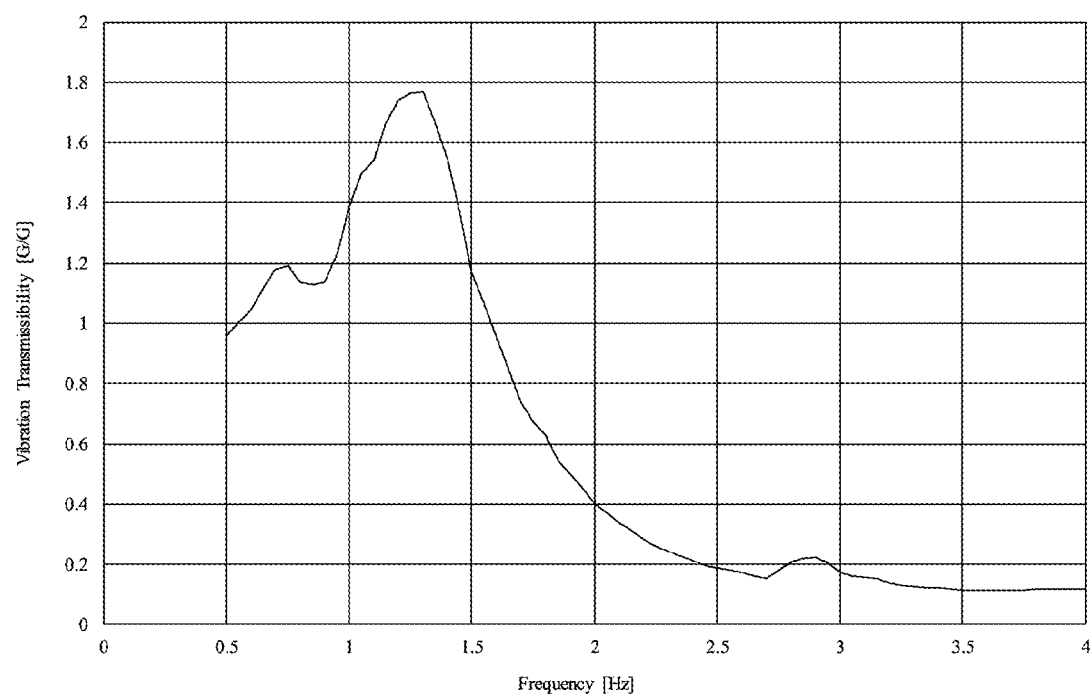

Next, the operation of this embodiment will be described based on FIG. 11. Suppose that the sensing-target angle of the lower frame-side torsion bar 141c when the upper frame 200 is at the middle position of the up-down displacement range is 23 degrees, for instance. The control unit 330 has stored it as the torsion angle that the lower frame-side torsion bar 141c has when the upper frame 200 is at the balanced point (balanced point torsion angle $\theta 1$). In this state, a person seats himself/herself on a seat of a vehicle, for example, an automobile, and starts the engine (S1). When the person seats himself/herself, his/her weight displaces the upper frame 200 in the up-down direction. Note that, in a state without no load applied to the seat before the person seats himself/herself, the control unit 330 preferably drives the motor 311 to make the upper frame 200 present at the uppermost end position (the position in FIG. 6(a)) (see Step S8 to be described later). In some cases, the displacement amount of the upper frame 200 is large because of the weight of the seated person, and to cope with this, the upper frame 200 is set to the uppermost end position.

The torsion angle detection sensor 320 detects a signal corresponding to a current torsion angle $\theta 2$ of the lower frame-side torsion bar 141c in the state where the upper frame 200 has been displaced by the person seated (S2). The control unit 330 receives the detection signal corresponding to the current torsion angle $\theta 2$ and compares it with the pre-stored balanced point torsion angle $\theta 1$ (S3). In the case where the current torsion angle $\theta 2$ differs from the balanced point torsion angle $\theta 1$, the control unit 330 outputs a control signal according to the difference to the motor 311 of the elastic force adjusting unit 310. Consequently, the rotational force transmission frame 312b is rotated forward or rearward by a predetermined amount through the rotary shaft 312a of the adjusting member 312 according to the rotation amount and the rotation direction of the motor 311, and further the first engagement plate 312c and the second engagement plate 312d rotate forward or rearward by a predetermined amount to twist the first upper frame-side torsion bar 141a and the second upper frame-side torsion bar 141b by a predetermined angle in either direction (S4).

In the case where it is determined at Step S3 that the current torsion angle $\theta 2$ agrees with the pre-stored balanced point torsion angle $\theta 2$ ("Yes" at Step S3), the control unit 330 causes the torsion angle detection sensor 320 to detect the current torsion angle $\theta 2$ of the lower frame-side torsion bar 141c for several seconds, and monitors how its output changes (S5). In the case where from the result of the monitoring, it turns out that the change in the current torsion angle $\theta 2$ falls out of a predetermined range ("No" at S5), the control unit 330 outputs a control signal to the motor 311 of the elastic force adjusting unit 310 to cause it to twist the first and second upper frame-side torsion bars 141a, 141b in either direction (S6). On the other hand, in the case where the control unit 330 determines at Step S5 that the change in the current torsion angle $\theta 2$ falls within the predetermined range ("Yes" at S5), it does not output the control signal to the motor 311. The above-described steps are repeated, and when the engine is turned off after the driving ends (S7), the control also ends. However, it is preferable to make the setting that when the engine is turned off, the motor 311 twists the first and second upper frame-side torsion bars 141a, 141b to return the upper frame 200 to the uppermost end position (the position in FIG. 6(a)) (S8).

This embodiment includes the body weight adjustment mechanism 300 for automatic adjustment as described above. Therefore, in the initial state when the person seats himself/herself (static state), only by the person seating himself/herself, the upper frame 200 is automatically brought to the neutral position irrespective of his/her weight. This makes it possible to improve vibration absorption characteristics and impact absorption characteristics.

Further, the control unit 330 of the body weight adjustment mechanism 300 constantly monitors the angle of the lower frame-side torsion bar 141c. Then, in the case where the monitored current torsion angle $\theta 2$ differs from the pre-stored balanced point torsion angle $\theta 1$ when the upper frame 200 is at the neutral position (balanced point), the control unit 330 adjusts the torsion angles of the first and second upper frame-side torsion bars 141a, 141b to move the upper frame 200 up or down even during traveling. Specifically, the body weight adjustment mechanism 300 successively obtains the information from the torsion angle detection sensor 320 not only in the static state but also in the dynamic state during traveling, and performs the control to move the seat suspension mechanism 1 up or down to make the current torsion angle $\theta 2$ of the lower frame-side torsion bar 141c agree with the balanced point torsion angle $\theta 1$, thereby constantly guiding the upper frame 200 to the balanced point position (the position in FIG. 6(b)). When the upper frame 200 is at the position in FIG. 6(b), which corresponds to the free running zone where substantially no damping force of the dampers 150, 160 is generated, the characteristic of the constant load region with a low spring constant, which is the characteristic of the spring mechanism 140 composed of the combination of the first spring part and the second spring part, is sufficiently made use of, and owing to the phase shift from the input vibration, high vibration absorption characteristics are obtained. Further, the upper frame 200 is always guided to the balanced point position, and therefore, even if impact force is applied, there are sufficient strokes both in the upward and downward directions, and when the upper frame 200 approaches the stroke end, the dampers 150, 160 exhibit higher impact absorption characteristics.

The invention claimed is:

1. A seat suspension mechanism disposed between a vehicle body structure and a seat, the seat suspension mechanism comprising:
    a base frame attached on a vehicle body structure side;
    a seat support frame attached on a seat side;
    an intermediate frame located between the base frame and the seat support frame;
    a first link mechanism supporting the intermediate frame with respect to the base frame;
    a second link mechanism supporting the seat support frame with respect to the intermediate frame;
    a first spring mechanism which elastically biases the intermediate frame;
    a second spring mechanism which elastically biases the seat support frame; and
    a damper suspended between the base frame and the seat support frame.

2. The seat suspension mechanism according to claim 1, wherein the first link mechanism and the second link mechanism each comprise a parallel link structure, and are attached so that a rotation direction of links of the first link mechanism and a rotation direction of links of the second link mechanism, in accordance with a displacement of the intermediate frame or the seat support frame, are opposite, and
    wherein the damper is attached in a position in an inclined direction opposite to an inclined direction of the links of the first link mechanism at a balanced point.

3. The seat suspension mechanism according to claim 1, wherein the first link mechanism and the second link mechanism each comprise a parallel link structure, and are attached so that a rotation direction of links of the first link mechanism and a rotation direction of links of the second link mechanism, in accordance with a displacement of the intermediate frame or the seat support frame, are opposite, and
    wherein the damper is attached in a position in an inclined direction opposite to an inclined direction of the links of the second link mechanism at a balanced point.

4. The seat suspension mechanism according to claim 1, wherein the first link mechanism and the second link mechanism each comprise a parallel link structure, and are attached so that a rotation direction of links of the first link mechanism and a rotation direction of links of the second link mechanism, in accordance with a displacement of the intermediate frame or the seat support frame, are opposite, and
    wherein two kinds of dampers whose inclined directions are opposite to each other are disposed.

5. The seat suspension mechanism according to claim 1, wherein as the first spring mechanism and the second spring mechanism, torsion bars linked to any link of the first link mechanism and any link of the second link mechanism to be rotated are respectively used, and an initial position at a twist angle of each of the torsion bars is adjustable.

6. The seat suspension mechanism according to claim 5, wherein when the torsion bar linked to any link of the second link mechanism is displaced downward from an upper position, the initial position is set to exhibit a negative spring characteristic of downward biasing to a predetermined position.

7. The seat suspension mechanism according to claim 1, wherein the first spring mechanism comprises:
    a linear spring which exhibits a linear characteristic of biasing in a direction of separating the intermediate frame from the base frame in a normal state; and
    a magnetic spring which includes stationary magnets and a movable magnet whose relative position to the stationary magnets is displaced in accordance with up-down movement of the intermediate frame relative to the base frame, and exhibits a nonlinear spring characteristic that a spring constant is changed depending on the relative position of the stationary magnets and the movable magnet, and
    wherein a spring characteristic of combining the linear spring and the magnetic spring includes a characteristic of being a constant load when the intermediate frame is located in a predetermined up-down movement range including a balanced point.

* * * * *